United States Patent [19] — [11] 4,194,405
Reynolds — [45] Mar. 25, 1980

[54] VIBRATOR DEVICES

[76] Inventor: Lionel A. Reynolds, Maryhill, Cheltenham Rd., Painswick, Stroud, England

[21] Appl. No.: 918,956

[22] Filed: Jun. 26, 1978

[30] Foreign Application Priority Data

Jul. 23, 1977 [GB] United Kingdom ............... 31037/77
Dec. 7, 1977 [GB] United Kingdom ............... 50836/77

[51] Int. Cl.² ............................................. F16H 33/10
[52] U.S. Cl. ....................................... 74/87; 404/117; 404/103; 366/125
[58] Field of Search .............. 404/117, 103; 74/573 F, 74/87; 366/116, 124, 125, 128

[56] References Cited

U.S. PATENT DOCUMENTS

| | | | |
|---|---|---|---|
| 2,534,269 | 12/1950 | Kahn | 74/573 F |
| 2,963,914 | 12/1960 | DuPouy | 74/87 |
| 3,605,584 | 9/1971 | Kaltenegger | 404/117 |
| 3,616,730 | 11/1971 | Boone | 404/117 |
| 3,656,419 | 4/1972 | Boone | 404/117 |
| 3,813,950 | 6/1974 | Ebersole | 74/87 |
| 3,888,600 | 6/1975 | Vural | 404/117 |
| 4,002,086 | 1/1977 | Reinhall | 74/573 F |

*Primary Examiner*—Nile C. Byers, Jr.
*Attorney, Agent, or Firm*—Cushman, Darby & Cushman

[57] ABSTRACT

Vibrator devices, of the type which produce a vibratory effect as a result of rotation of an out-of-balance mass, comprise a casing and a rotor which has a fluid-containing cavity with the contained body of fluid contacting a swept annular surface of the casing. A piston movable radially in the rotor and/or the body of fluid provides the out-of-balance mass and the vibratory force is transmitted to the casing directly by the fluid pressure on the swept annular surface thereof. The rotor structure is mechanically balanced so that substantially no vibratory force is transmitted through the rotor shaft and bearings.

10 Claims, 8 Drawing Figures

VIBRATOR DEVICES

BACKGROUND OF THE INVENTION (a) Field of the Invention

This invention relates to vibrator devices of the type which produce a vibratory effect as a result of rotation of an out-of-balance mass. It is of particular, but by no means exclusive, application to vibratory surface compactors and especially vibratory road rollers.

(b) Description of the Prior Art

Devices of the type concerned normally employ a mechanically unbalanced rotor on rotation of which the resultant vibratory force is transmitted to the body being vibrated through the rotor shaft and the bearings thereof. Vibratory road rollers are now in common use, the drum of such a roller being vibrated to increase the ground compacting effect several times as compared with that of a dead-weight roller of the same weight. Conventional vibratory rollers employ a system of eccentric weights mounted within the drum on a high-speed spindle which passes through the drum coaxially thereof and which is coupled externally to a separate vibrator engine.

The eccentric weights revolve at high speed to produce the high centrifugal vibratory forces and vibratory frequency required to compact the surface being rolled. These high frequency forces are transmitted to the drum through the spindle bearings of the roller and on large machines the centrifugal forces and the inertia of the eccentric weights and associated mechanism imposes very high stresses of an unfavourable nature on the bearings and the control and drive mechanism, necessitating a heavy and expensive construction.

The bearings are accordingly costly and they moreover tend to have a short life. A further disadvantage is that the spindle must be accelerated rapidly up to a high speed at the start of a rolling operation, and decelerated rapidly at the end thereof as vibration of the drum with the roller stationary would produce unacceptable ground indentation. Thus a large vibrator engine is required, particularly in relation to the normal power output required, and complex drive and brake arrangements are required which are also subject to rapid wear.

SUMMARY OF THE INVENTION

The object of the invention is to provide a vibrator device which can be designed so that the vibratory force is not transmitted through the rotor bearings. Thus as applied to a road roller vibrator rotor bearings of cheaper construction and, in particular, longer life can be employed. A further object is to provide such a road roller which can be designed to obviate the present need for extremely rapid acceleration and deceleration of the rotor, thereby allowing use of a smaller vibrator engine and less complex drive and brake arrangements which also are less subject to wear.

The invention broadly comprises a vibrator device of the foregoing type comprising means defining a cavity adapted to contain a body of fluid and rotatable about an axis eccentric with respect to the centre of gravity of the fluid body with the fluid in contact with a swept outer annular surface, whereby said rotation produces centrifugally a vibrating force which is transmitted directly to said surface by the fluid pressure thereon.

Accordingly the invention provides a vibrator device which comprises a casing and a rotor, on rotation of the rotor a body of fluid contained in the rotor and eccentric of the rotation axis transmitting a vibratory force to a swept internal surface of the casing directly by fluid pressure on that surface which is contacted by the body of fluid. Preferably the rotor structure is mechanically balanced, so that substantially no vibratory force is transmitted through the rotor shaft and bearings.

The rotary out-of-balance mass, rotation of which produces the centrifugal force transmitted as a rotary vibratory force by the fluid pressure, may entirely consist of the mass of the fluid itself and in this case the fluid is preferably a liquid such as oil. However, the mass may comprise a piston free to move radially in the rotor against the body of fluid, and the fluid volume may be variable to adjust the radial position of the piston and thus control the magnitude of the vibratory force.

It will be appreciated that in the radial direction the body of fluid, which will normally be a liquid, is contained within the rotor by the swept annular surface, and that in any practical construction there will be leakage of the liquid at the rotor periphery which leakage must be replenished by suitable means. Preferably the leakage liquid is collected at said internal surface and recirculated, being fed back into the rotor towards the centre thereof. This recirculation, or alternative make-up from an external reservoir, may be automatic with the circulating pressure obtained from rotation of the rotor with the latter acting as a centrifugal impeller although embodiments employing a free piston will in general require the provision of a circulating pump to maintain the appropriate balancing pressure on the piston.

In order to reduce leakage the rotor may be provided with a radially movable tip which contacts and seals against the swept internal surface of the casing, the tip being sealed with respect to the main body of the rotor and preferably resiliently urged against the surface in the static condition. This tip may comprise a single sealing element which encircles the body of liquid and engages telescopically within said main body of the rotor, and a resilient sealing member may provide the seal with respect to that body and also the resilient force which urges the tip against the swept surface in the static condition. It will be appreciated that in use centrifugal force will urge the tip into sealing contact with the surface and maintain that contact, and if necessary the form of the tip element can be such that a pressure-assisted seal results.

The casing of the device may be provided by the structure to be vibrated or may be attached thereto. In a vibratory road roller, in which context the invention will be more particularly described hereinafter, two identical devices operating in phase will normally be employed mounted within the vibratory drum and respectively fixed to the two end plates thereof. These devices may have separate rotor spindles rotated in synchronism by the external drive means or be coupled by a shaft extending through the drum.

Other features of the invention will be apparent from the following description, drawings and claims, the scope of the invention not being limited to the drawings themselves as the drawings are only for the purpose of illustrating a way in which the principles of the invention can be applied. Other embodiments of the invention utilising the same or equivalent principles may be used and structural changes may be made as desired by those skilled in the art without departing from the present invention and the purview of the appended claims.

DESCRIPTION OF THE PREFERRED EMBODIMENTS

Figure 1:
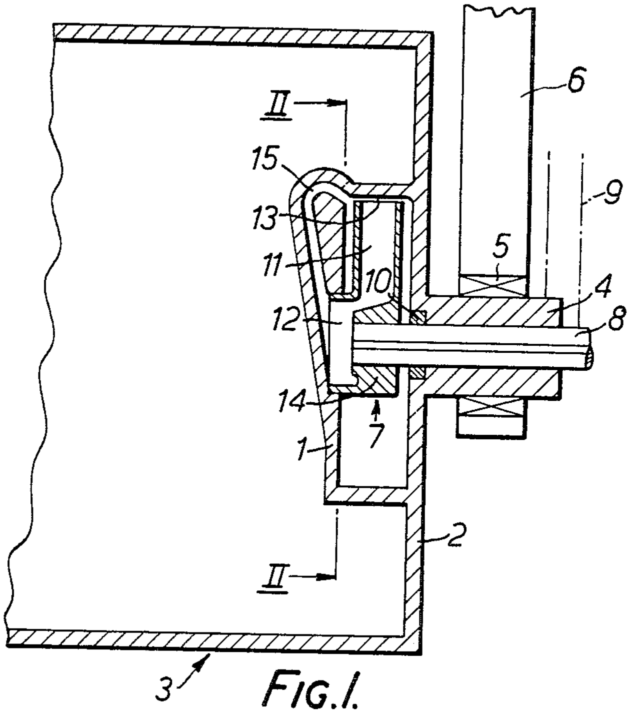
FIG. 1 illustrates a first embodiment and shows in axial section one end of a drum of a vibratory road roller and a vibrator device in accordance with the invention mounted therewith.

In each of the embodiments illustrated the vibrator device has a casing 1 either integral with or mounted on an end plate 2 of the vibratory drum 3 of the road roller. A stub shaft 4 by which the drum 3 is rotatably mounted extends through a roller bearing 5 in a drum support frame 6. A vibrator rotor 7 rotatable within the casing 1 is mounted on a spindle 8 which is rotatably supported coaxially within the stub shaft 4 from which it projects for coupling to an external vibrator drive 9 by which the rotor 7 is in use driven at high speed by a vibrator engine (not shown).

The spindle 8 is surrounded by a sealing gland 10 where it enters the casing 1, and the rotor 7 while of eccentric form is substantially mechanically balanced so that it produces no mechanical vibratory force acting on the spindle 8. On the side above the spindle 8 the rotor (in the position illustrated) defines an eccentric cavity 11 which is use contains a body of liquid, which will normally be oil. The tip of the rotor 7 has a close clearance with respect to a swept inner annular surface 13 of the casing 1 so that this surface effectively closes the cavity 11 on the radially outer side thereof.

In the embodiments of FIGS. 1 to 4 the solid portion 14 of the rotor 7 below the spindle 8 acts as a bob weight to balance the main body of the rotor, and the out-of-balance mass, rotation of which provides the centrifugal force producing the vibratory action, is provided entirely by the mass of fluid contained within the cavity 11. During operation the rotor operates as a centrifugal impeller to recirculate the liquid and thus replenish the leakage of liquid at the rotor periphery.

Figure 2:
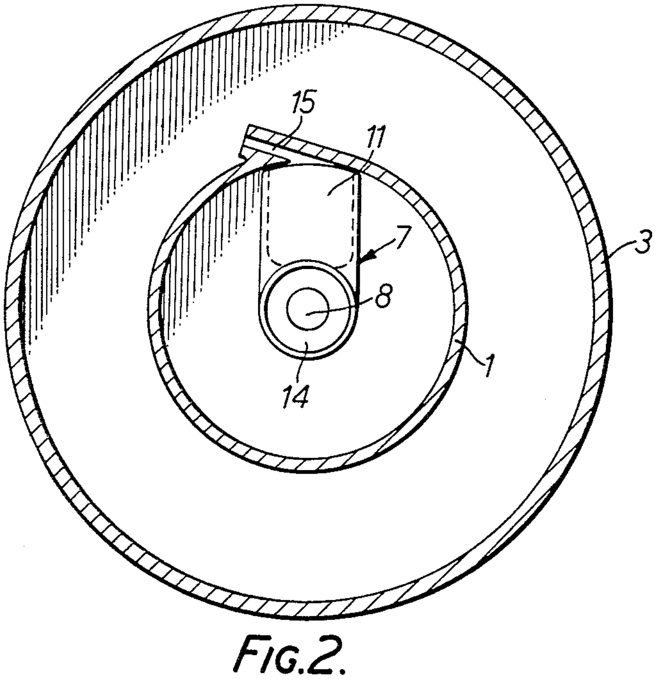
FIG. 2 is a sectional view on the line II—II in FIG. 1.

The first embodiment of FIGS. 1 and 2 has a leakage conduit 15 formed within the casing 1 on the inner side thereof and leading from a point adjacent the surface 13 to a free space 12 at the centre or "eye" of the impeller on the inner side thereof. In operation the rotor is filled with liquid and when the rotor 7 revolves at high speed the liquid contained in the cavity 11 is subject to a high centrifugal force which creates a radially outward pressure in the liquid. The pressurised liquid reacts against the casing 1 so that a rotating force to vibrate the drum 3 is transmitted to the casing, and hence to the drum, hydraulically by fluid pressure on the surface 13.

Leakage from the cavity 11 between the tip of the rotor 7 and the surface 13 is projected tangentially along that surface and remains in contact therewith. Due to the operation of the rotor as a centrifugal impeller a depression results in the space 12, so that the leakage is picked up and recirculated via the conduit 15.

Figure 3:
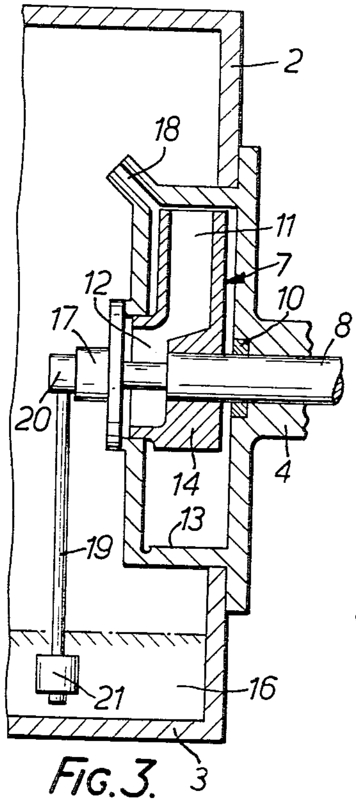
FIGS. 3 and 4 are views similar to FIG. 1 but of second and third embodiments.

The energy imported to the leakage liquid may be high so that steps must be taken to cool it and thus dissipate this energy. FIG. 3 illustrates one manner of doing this, with the leakage liquid recirculated via a comparatively large reservoir of make-up liquid contained in the bottom of the drum 3. A make-up pump 17 mounted on the casing 1 is coupled to the inner end of the spindle 8 and supplies the central space 12. The leakage liquid spills out into the drum 3 through a spillage conduit 18, and the pump 17 draws the make-up liquid through a suction pipe 19 which dips into the reservoir 16. The suction pipe 19 is connected to the pump 17 through a rotating gland joint 20, and it is maintained substantially vertical within the slowly rotating drum by a bob weight 21.

The liquid in the reservoir 16 not only provides make-up liquid, with excellent heat dissipation as it swills around in the drum 3, but it also provides additional dead weight for the roller. Thus with this embodiment the reservoir liquid volume can be varied to change the roller weight, should this be desired.

Figure 4:
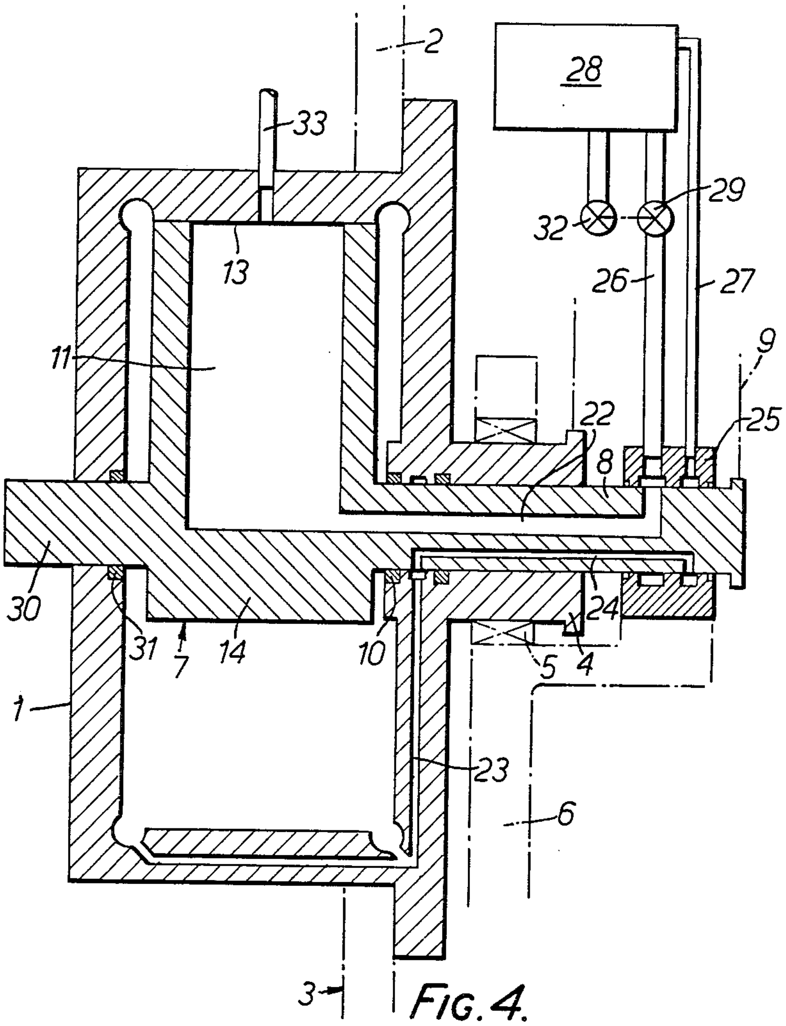

FIG. 4 illustrates a more sophisticated embodiment which again recirculates a comparatively large volume of liquid and thus dissipates energy in the leakage liquid, and which also enables the vibratory force to be varied without changing the spindle speed. In particular it enables the vibratory force rapidly to build up from zero and rapidly to be reduced to zero while the spindle 8 is running at normal speed. The free space 12 of the earlier embodiment is omitted and the radial inner end of the rotor cavity 11 communicates with a supply conduit 22 within the spindle 8. A leakage conduit 23 is again provided to collect the leakage at the surface 13, but in this case it communicates, within the sealing gland 10, with a return conduit 24 within the spindle 8. A rotary seal 25 surrounding the projecting outer end of the spindle 8 is mounted in the support frame 6, and within this the spindle conduits 22 and 24 are respectively connected with external supply and return conduits 26,27.

The conduit 26 is fed by gravity from an external liquid supply tank 28 through an adjustable restrictor valve 29, and the conduit 27 discharges into this tank. If found necessary an oil cooler (not shown) can be fitted in the return conduit 27 to cool the return flow. The valve 29 operates as a metering valve through which the rotor tip leakage is made up from the tank 28. With the valve 29 closed leakage rapidly empties the rotor cavity 11 and the vibratory force is reduced to zero with the spindle 8 running at normal speed. This is the condition at the commencement of a rolling operation, and opening the valve 29 produces a rapid build up of liquid in the cavity 11 to commence vibration as the rolling operation starts. At the end of that operation the valve 29 is closed so that vibration rapidly ceases.

The valve 29 has an intermediate range of settings each of which results in a stable condition in which the rotor cavity 11 is only partially filled with liquid, the degree of filling depending on the restriction provided by the valve 29 and hence on the setting thereof. Thus a different setting of the valve 29 provides a different mass of liquid in the cavity 11 with a different vibratory force, so that the valve can be set to provide the vibratory force required and may provide an infinitely adjustable range of vibratory amplitude for any spindle speed. The rotational speed of the spindle 8 governs the vibratory frequency and can also be adjustable if required.

As previously mentioned two identical devices will normally be employed operating in phase and respectively fixed to the two end plates of the drum 3. The rotor 7 of the device of FIG. 4 has an inner stub shaft 30 projecting from the inner side of the casing 1 through a seal 31, and this allows direct mechanical coupling, within the drum 3, with an identical device mounted at the other end of the drum. For controlling the liquid supply to this other device a second restrictor valve 32, identical with and ganged to the valve 29, is provided for simultaneous identical control of the two devices. It will be appreciated that for a given valve setting the volume of liquid contained in the corresponding rotor cavity 11 will depend on the rotor tip leakage, which will to some extent vary with every device. This variation can be accommodated by initial setting-up adjustment of the valves 29 and 32, but it may be necessary and is in any case preferable to provide specific means to equalise the vibrating forces. This is achieved in the device of FIG. 4 by providing a balancing conduit 33 terminating at the periphery of the casing 1 as shown and interconnecting the two devices within the drum 3. The two ends of the conduit 33 are similarly positioned on the two casing peripheries, thus operating to allow the liquid pressures in the two rotors to equalise when they simultaneously pass over the conduit terminations in the casings 1. During the time taken for the rotor 7 to pass over the ends of the conduit 33 any pressure difference will result in a flow of liquid along that conduit in a direction to equalise the rotor pressures. A plurality of such conduits may be provided distributed around the periphery of each casing 1 to provide a more even balancing action, should this be required.

Figure 5:
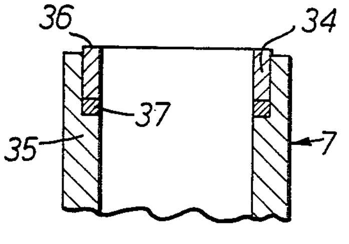

The modification of FIG. 5 has for its object to reduce leakage between the rotor 7 and the casing 1, thereby reducing the wasted energy imported to the leakage fluid, and it can be employed with any one of the embodiments described. The tip of the rotor 7 which contacts and seals against the surface 13 is provided by a separate sealing element 34 which is radially slidable and engages telescopically within the main body 35 of the rotor. This element is of ring-like one-piece form and has a part-cylindrical outer surface 36 complementary to the swept casing surface 13. A sealing member 37 at the inner end of the element 34 seals the latter relatively to the main body 35 of the rotor and provides a light resilient sealing force which urges the element 34 into contact with the swept surface 13 to provide a seal in the static condition.

During rotation of the rotor 7 centrifugal force provides the main sealing pressure of the element 34 against the swept surface 13. The liquid pressure acting at the inner end of the element 34 can also be employed to provide a pressure-assisted seal, so that under dynamic conditions centrifugal force and liquid pressure act to minimise the working clearance of the rotor with the casing 1. The sealing element 37 can be of any suitable form, for example an O-seal or a lipped seal.

It will be appreciated that instead of the sealing element 34 shown a separate spring and liquid seal may be used, and that by selecting a suitable sealed area for the slidable tip element 34 the working clearance between the rotor and the casing can be regulated to an optimum value which gives a desired minimum leakage and at the same time maintains a running liquid film. A further advantage of the sealing arrangement of FIG. 5 is the reduced constructional cost resulting from the elimination of the close manufacturing tolerance involved in maintaining the necessary small running clearance between a one-piece rotor and the casing. Yet another advantage is the ability of the slidable tip element 21 to compensate for changes in liquid viscosity, thereby maintaining a substantially constant leakage flow rate.

Figure 6:
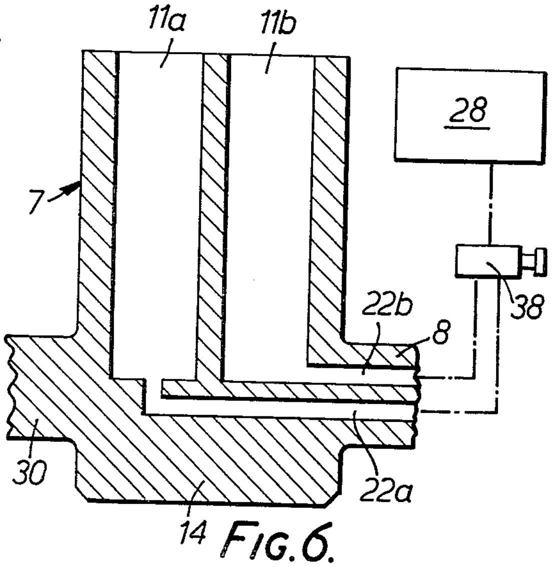
FIGS. 5 and 6 are detail views illustrating modifications.

The modification of FIG. 6 divides the cavity 11 of the rotor 7 into a plurality of separate chambers two of which, denoted 11*a* and 11*b*, are shown in this figure. Separate supply conduits 22*a*,22*b* for the respective chambers are provided in the spindle 8, supplied from the tank 28 via a selector control valve 38. This valve is arranged to control the flow of liquid to each chamber, so that one or more chambers may be filled according to the desired vibratory amplitude. It will be appreciated that the chambers may be of differing effective liquid means, i.e. the volumes and/or radial positions of the volume centres may be varied, and that restrictor valve control may be employed to allow operation with the chambers only partially filled.

Figure 7:
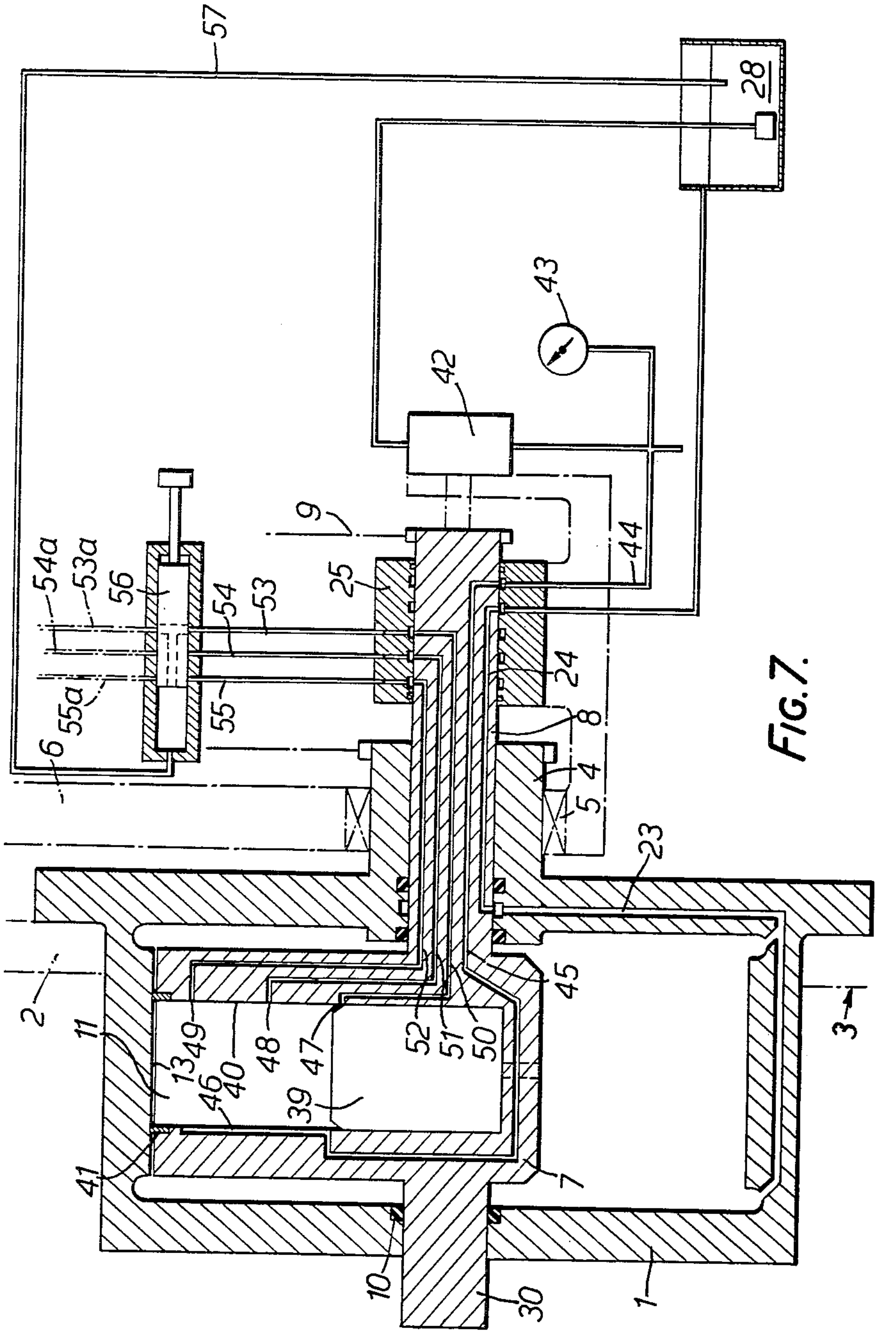
FIG. 7 is a view similar to FIG. 1 illustrating a fourth embodiment.

In the embodiment of FIG. 7 the rotary out-of-balance mass is mainly provided by a cylindrical free piston 39 slidable in the cavity 11 which is now provided by a radial bore 40 in the rotor 7. The specific gravity of the piston 39 is considerably greater than that of the liquid which fills the cavity 11 outwardly of the piston, so that the vibratory amplitude is dependent on the radial position of the piston and a given maximum amplitude can be achieved with a much smaller rotor than with the solely liquid-filled embodiments already described.

This embodiment has a rotor tip seal 41 as described in connection with FIG. 5, and as in FIG. 4 leakage liquid is collected by return conduits 23,24 which connect at a rotary seal 25 and drain into a supply tank 28. However, in this case the make-up fluid is supplied from the tank 28 by a supply pump 42 the pressure of which, indicated by a pressure gauge 43, is utilised for control purposes. The pump 42 supplies the cavity 11 through an external supply conduit 44, and a supply conduit 45 through the spindle 8 and which opens into the rotor bore 40 through an axially elongated port 46 open to the cavity 11 in all radial positions of the piston 39. Positional control ports 47,48 and 49 axially spaced within the bore 40 connect through separate return conduits 50,51 and 52 in the spindle 8, and external return conduits 53,54 and 55, with a selective valve 59 which discharges through conduit 57 into the tank 28.

The free piston 39 is initially positioned (as shown) in the bore 40 so that its centre of gravity is only slightly displaced from the axis of rotation. The slight displacement creates sufficient centrifugal bias upon rotation to move the piston 39 outwardly when the pressure of the volume of liquid in the cavity 11 allows it to do so. Before, or at the same time as, the rotor 7 rotates the pump 42 supplies liquid to fill the rotor and this initially holds the piston 39 in its innermost position shown. The slight liquid pressure required to balance the bias of the piston is created by the flow of liquid escaping through the first control port 47, the control ports 48 and 49 being closed when starting up by the selector valve 56. To increase the vibrating force to a maximum value the selector valve is moved so as to close the port 47 and open the port 49. The liquid pressure in the cavity 11 will as a result decrease allowing the piston to move outwardly until it partially closes the port 49 which is accordingly throttled to the degree necessary to provide a pressure which balances the piston 39 in this position. This balancing back pressure of the flow of liquid escaping through the partially closed port is shown by the pressure gauge which thus provides an indication of the vibratory magnitude. To reduce the vibrating force to some intermediate value the selector valve 56 is moved so as to close the ports 47 and 49 and open the port 48. Since the liquid can no longer escape from the cavity 11 pressure rises and forces the piston inwardly until the port 48 is uncovered sufficiently to provide a fluid pressure which will just balance the centrifugal force acting on the piston in that position. FIG. 7 illustrates only the one intermediate position described, but if desired could be provided by increasing the number of control ports accordingly.

Disturbing forces brought about by slightly changing conditions, for instance a change in rotor speed, are automatically corrected by a small movement of the piston 39 with respect to the control port being throttled, to readjust the balancing pressure as necessary. The supply of liquid by the pump 42 must at all times be sufficient to make up the leakage at the rotor tip and also to provide the necessary flow through the control ports for positional control purposes. The pump supply pressure varies in accordance with the centrifugal force on the free piston 39, so that the pressure gauge 43 provides a simple means of indicating the amplitude of the vibratory force.

As with the FIG. 4 embodiment the rotor 7 has an inner stub shaft 30 for coupling to an identical device at the other end of the roller drum 3. To provide identical positional control of the pistons of the two devices, the valve 56 is connected to the other device through return conduits **53*a*,54*a* and 55*b* which duplicate the conduits 53,54 and 55** of the device described.

Figure 8:
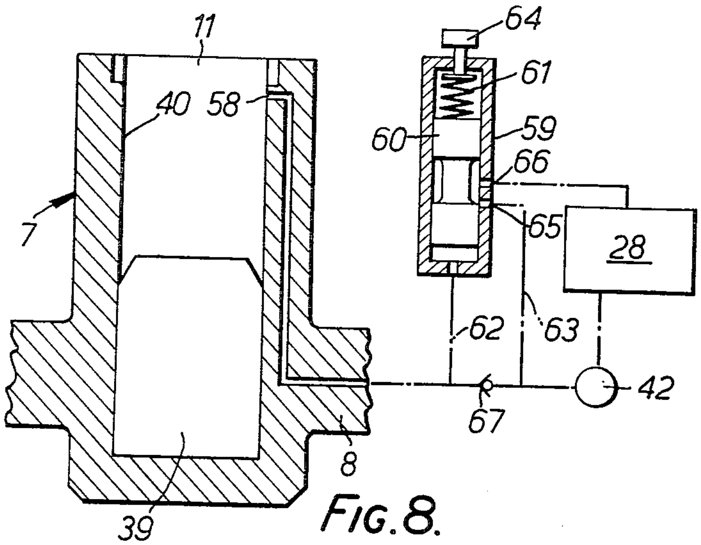
FIG. 8 illustrates a modification of the embodiment of FIG. 7.

FIG. 8 illustrates an alternative method of control applicable to the free piston arrangement of FIG. 7. In this modification a single supply port 58 is positioned in the rotor bore 40 near to the radially outer end thereof, the position of this port determining the outermost piston position. No other ports are provided in the bore 40, and the supply pressure at the supply conduit 45 through the spindle 8 is controlled by a pressure control valve 59 connected to the output of the pump 42. The valve 59 contains a throttling valve member 60 which is subject at one end to the force of a spring 61 and at the other end to the supply pressure sensed via a conduit 62. The valve member throttles a by-pass flow through conduit 63 from the pump 42 back to the tank 28.

In the start-up piston position shown the load of the valve spring is set, by means of an adjusting screw 64, to maintain a supply pressure sufficient to hold the piston 39 in this innermost position against the centrifugal forces acting on both the piston and the liquid in the cavity 11. The pump flow in excess of the rotor tip leakage is spilled back to tank through ports 65 and 66 in the valve 59. Increasing the spring load by means of the screw 64 momentarily considerably increases the opening of the port 65 thereby reducing the supply pressure and allowing the piston to move radially outwards until a stable condition is reached when the fluid pressure in the cavity 11 balances the pressure created by the flow of liquid past the valve port 65, this pressure being determined by the spring load.

Reducing the spring load, by turning the screw 64, momentarily allows the supply pressure acting on the valve member 60 to close down the port 65 thereby raising the fluid pressure in the cavity 11. This pressure moves the piston 39 inwardly until a new balanced condition results, the piston position for this being dependent on the spring setting. Thus the piston position is infinitely adjustable, the magnitude of the vibratory force being dependent on the setting of the adjusting screw 64. A one-way valve 67 may in some cases be found desirable, positioned as shown in the supply conduit between the conduits 62 and 63, in order to increase stability in the control circuit.

It will be appreciated that with embodiments employing a free piston the body of liquid can be of very small radial dimension, and in the limit merely of a radial thickness which provides a thin film or layer of the fluid between the piston and the casing sufficient to avoid direct contact between these parts. References herein and in the appended claims to a body of fluid and a cavity to contain a body of fluid are to be construed as including arrangements which satisfy this limiting condition, such arrangements being within the purview of the claims.

In the application of the invention to a road roller the rotor of the vibrating device preferably rotates in the same direction as the device casing and roller drum, whereby the viscous drag occurring at the periphery of the rotor assists in rotating the drum.

I claim:

1. A vibrator device comprising a rotor, said rotor having a cavity open at a peripheral region of the rotor and adapted to contain a body of fluid which is eccentric of the rotation axis of the rotor, and a casing with a swept internal surface surrounding said rotor and contacted by said body of fluid, whereby on rotation of the rotor relative to the casing a vibratory force is transmitted to said swept internal surface of the casing directly by fluid pressure on that surface.

2. A device according to claim 1, wherein an out-of-balance mass the rotation of which produces said vibratory force transmitted by said fluid pressure entirely consists of the mass of said body of fluid which contacts said swept internal surface of the casing.

3. A device according to claim 2, wherein said rotor is adapted to operate as a centrifugal impeller to induce a flow of fluid to make up fluid leakage at the tip of the rotor between the rotor and the casing, an external fluid reservoir from which the make-up fluid is supplied is provided by a drum of a vibratory road roller vibrated by the device, and a make-up pump is connected to supply the centrifugal impeller from the reservoir.

4. A device according to claim 1, wherein said rotor has a radially movable tip which contacts and seals against said swept internal surface of the casing, said tip being sealed with respect to the main body of the rotor.

5. A vibrator device comprising a rotor, said rotor having a cavity open at a peripheral region of the rotor and adapted to contain a body of fluid which is eccentric of the rotation axis of the rotor, a casing with a swept internal surface surrounding said rotor and extending over said peripheral region thereof, and means rotatably supporting and for driving said rotor about said rotation axis relative to said casing, said swept surface of the casing extending close to said peripheral rotor region to contain said body of fluid in said cavity and thus being contacted by said body of fluid and subject to the fluid pressure therein.

6. A device according to claim 5, wherein an out-of-balance mass the rotation of which produces a vibratory force transmitted to the casing by said fluid pressure consists entirely of the fluid contained in the rotor and which the swept surface of the casing, and means to control the magnitude of the vibratory force comprise a restrictor valve through which said cavity is supplied to make up fluid leakage at the tip of the rotor between the rotor and the casing, the restrictor valve being adjustable to vary the mass of fluid in the cavity.

7. A vibrator device comprising a rotor defining a cavity adapted to contain a body of fluid which is eccentric of the rotation axis of the rotor, and a casing with a swept internal surface contacted by said body of fluid and surrounding the rotor which is mounted for rotation relative to the casing whereby on rotation of the rotor relative to the casing a vibratory force is transmitted to said swept internal surface of the casing directly by fluid pressure on that surface, and an out-of-balance mass the rotation of which produces said vibratory force transmitted by said fluid pressure comprises a piston mounted in the rotor so as to be free to move radially outwardly against the body of fluid, whereby an rotation of the rotor centrifugal force urging the piston radially outwardly is balanced by said fluid pressure.

8. A device according to claim 7, wherein said piston is slidable in a radial bore in the rotor which bore also contains said body of fluid radially outwardly of the piston, and a pump is connected to supply fluid to the outer end of said bore to make up fluid leakage at the tip of the rotor and to maintain said fluid pressure whereby to retain the piston in a pressure-balanced radial position.

9. A device according to claim 8, wherein a fluid return port is positioned in the wall of said bore whereby said piston is automatically positioned to throttle the return port sufficiently to maintain said fluid pressure at a piston-balancing value.

10. A device according to claim 8, further comprising an adjustable pressure-control valve which senses said fluid pressure and controls the fluid supply to said bore by said pump, whereby to maintain said piston at a predetermined pressure-balanced radial position.

* * * * *